(12) United States Patent
Shin et al.

(10) Patent No.: US 11,584,351 B2
(45) Date of Patent: Feb. 21, 2023

(54) PARKING RELEASE MONITORING DEVICE FOR AUTOMATIC TRANSMISSION VEHICLE

(71) Applicant: Hyundai Kefico Corporation, Gunpo-si (KR)

(72) Inventors: Chang Kyu Shin, Gunpo-si (KR); Ji Young Jung, Seongnam-si (KR)

(73) Assignee: Hyundai Kefico Corporation, Gunpo-si (JP)

( * ) Notice: Subject to any disclaimer, the term of this patent is extended or adjusted under 35 U.S.C. 154(b) by 224 days.

(21) Appl. No.: 17/118,302

(22) Filed: Dec. 10, 2020

(65) Prior Publication Data

US 2021/0179058 A1 Jun. 17, 2021

(30) Foreign Application Priority Data

Dec. 13, 2019 (KR) .......................... 10-2019-0167290

(51) Int. Cl.
*B60W 10/18* (2012.01)
*B60W 30/19* (2012.01)

(52) U.S. Cl.
CPC .......... *B60W 10/182* (2013.01); *B60W 30/19* (2013.01); *B60W 2510/0208* (2013.01); *B60W 2510/186* (2013.01); *B60W 2510/188* (2013.01)

(58) Field of Classification Search
CPC ............... B60W 10/182; B60W 30/19; B60W 2510/0208; B60W 2510/186; B60W 2510/188

See application file for complete search history.

(56) References Cited

U.S. PATENT DOCUMENTS 10,604,136 B1 * 3/2020 Williams ................ B60T 17/22
2019/0063597 A1 2/2019 Berger et al.

FOREIGN PATENT DOCUMENTS

DE 102016104690 A1 9/2016
JP 2010054010 A 3/2010
(Continued)

OTHER PUBLICATIONS

KR20050098653A Translate.*
KR20110061198A Translate.*
KR20170120230A Translate.*

*Primary Examiner* — Tyler J Lee
*Assistant Examiner* — Yufeng Zhang
(74) *Attorney, Agent, or Firm* — Morgan, Lewis & Bockius LLP (57) ABSTRACT

A parking release monitoring device for an automatic transmission vehicle is proposed. The device includes: a receiver sensing an output signal of a shift lever; a determiner determining a target gear stage in accordance with the output signal of the shift lever; a driver transmitting a control signal to a parking solenoid to engage a parking sprag and applying a driving current to a clutch control solenoid to engage a clutch and prevent rolling of the vehicle when the determined target gear stage is a P-gear stage; and a detector measuring the intensity of the driving current applied to the clutch control solenoid, in which the determiner receives intensity information of the driving current applied to the clutch control solenoid from the detector and compares the received intensity information of the driving current with the output signal of the shift lever, thereby determining whether parking release has occurred.

6 Claims, 5 Drawing Sheets

(56) References Cited

FOREIGN PATENT DOCUMENTS

| | | |
|---|---|---|
| JP | 2015116921 A | 6/2015 |
| JP | 2015189437 A | 11/2015 |
| JP | 6013016 B2 | 10/2016 |
| KR | 19950006677 Y1 | 8/1995 |
| KR | 20050098653 A | 10/2005 |
| KR | 20110061198 A | 6/2011 |
| KR | 1020170120230 A | 6/2011 |
| KR | 20120060506 A | 6/2012 |
| KR | 20170120230 A | 10/2017 |
| KR | 1020110061198 A | 10/2017 |

* cited by examiner

PARKING RELEASE MONITORING DEVICE FOR AUTOMATIC TRANSMISSION VEHICLE

CROSS REFERENCE TO RELATED APPLICATION

The present application claims priority to Korean Patent Application No. 10-2019-0167290, filed Dec. 13, 2019, the entire contents of which is incorporated herein for all purposes by this reference.

BACKGROUND OF THE INVENTION

Field of the Invention

The present disclosure relates to a parking release monitoring device for an automatic transmission vehicle and, more particularly, to a parking release monitoring device that can monitor whether parking release occurs by determining whether an output signal from a shift lever and a driving current of a clutch control solenoid are matched.

Description of the Related Art

In an automatic transmission vehicle, a target gear stage is determined using information such as the speed of the vehicle, the RPM of the engine, the degree of opening of a throttle valve, the temperature of oil, the temperature of a coolant, the temperature of intake air, and the amount of air, and shifting is performed into the target gear stage by operating several actuators (solenoid valves). In particular, when a driver moves to a shift lever to a P-gear stage, not only a clutch control solenoid, but also a parking sprag control solenoid are operated, thereby restricting movement of the vehicle. An automatic transmission vehicle of the related art of which parking is controlled in this way is shown in FIG. 1.

Figure 1:
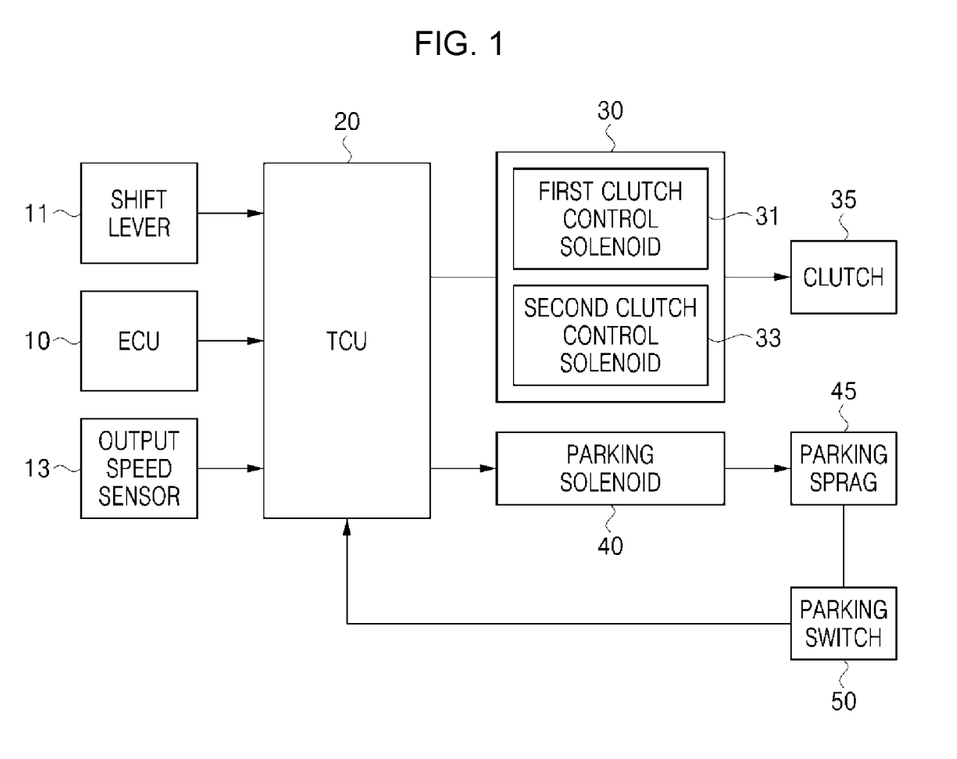
FIG. 1 is a diagram showing a parking release monitoring device of the related art.

As shown in FIG. 1, a TCU 20 receives gear range operation information by a driver from a shift lever 11, receives RPM information of an engine from an Engine Control Unit (ECU) 10, and receives output speed information of a vehicle from an output speed sensor 13. When the shift lever 11 is moved to a P-gear stage and the RPM of the engine and the output speed of the vehicle are matched with predetermined reference conditions, the TCU 20 can determine that the target gear stage is the P-gear stage. In this case, the TCU 20 engages a parking sprag 45 by sending a driving signal to a parking solenoid 40, thereby restricting movement of the vehicle. The TCU 20 further engages a clutch 35 by applying a driving current to first and second clutch control solenoids 31 and 33, thereby being able to more effectively prevent rolling of the vehicle.

A parking state is unexpectedly removed due to an electrical error of the TCU 20, etc., a safety accident may occur due to rolling of the vehicle. Accordingly, it is required to continuously monitor whether a parking state is maintained. In the related art, a parking state was monitored through a parking switch 50 disposed at a parking sprag 45. The parking switch 50 transmits a feedback signal to the TCU 20 and the TCU 20 can monitor whether a parking state is maintained by analyzing the feedback signal.

However, since the parking release monitoring device of the related art requires an additional parking switch 50, there is a defect that a problem of an additional cost is generated and it is impossible to check malfunction of the parking switch 50 even if the parking switch 50 breaks. Further, since the parking switch 50 is a sensor that analyzes physical behaviors of the parking sprag 45, even though parking release occurs, there is necessarily a certain time difference until the TCU 20 senses the parking release. However, when parking release occurs on a slope, etc., a safety accident may occur within not more than several seconds, so there is a need for a monitoring device that can immediately recognize whether parking release has occurred.

SUMMARY OF THE INVENTION

An objective of the present disclosure is to provide a parking release monitoring device that can immediately recognize whether parking release has occurred even without a specific parking switch sensor.

However, the objectives of the present disclosure are not limited to those described above and may be expanded in various ways without departing from the spirit and scope of the present disclosure.

In order to achieve the objectives, a parking release monitoring device for an automatic transmission vehicle according to exemplary embodiments includes: a receiver sensing an output signal of a shift lever; a determiner determining a target gear stage in accordance with the output signal of the shift lever; a driver transmitting a control signal to a parking solenoid to engage a parking sprag and applying a driving current to a clutch control solenoid to engage a clutch and prevent rolling of the vehicle when the determined target gear stage is a P-gear stage; and a detector measuring the intensity of the driving current applied to the clutch control solenoid. The determiner receives intensity information of the driving current applied to the clutch control solenoid from the detector and compares the received intensity information of the driving current with the output signal of the shift lever, thereby determining whether parking release has occurred.

In the exemplary embodiments, the clutch control solenoid may include first and second clutch control solenoids. When the target gear stage is the P-gear stage, the driver may apply a first driving current to the first clutch control solenoid and a second driving current to the second clutch control solenoid.

In the exemplary embodiments, the determiner may determine that parking release has occurred when the driving current of the first clutch control solenoid measured by the detector is smaller than the first driving current and the driving current of the second clutch control solenoid is smaller than the second driving current.

In the exemplary embodiments, the determiner may determine that parking release has occurred when the driving currents of the first and second clutch control solenoids measured by the detector are maintained smaller than the first and second driving currents for a predetermined time or more.

In the exemplary embodiments, when the determiner determines that parking release has occurred, the driver may transmit again a parking sprag engagement signal to the parking solenoid and may apply again a driving current to the clutch control solenoid.

In the exemplary embodiments, the parking release monitoring device may further include an outputter outputting a warning signal when the determiner determines that parking release has occurred.

In order to achieve the objectives of the present disclosure, an a parking release monitoring method for an automatic transmission vehicle includes: a shift level-determining step of determining a target gear stage by receiving a shift lever operation signal from a driver; a parking step of engaging a parking sprag by outputting a control signal to a parking solenoid and of engaging a clutch by applying a predetermined driving current to a clutch control solenoid when determining that the target gear stage is a P-gear stage; a first monitoring step of measuring a driving current applied to the clutch control solenoid; and second monitoring step of determining whether parking release has occurred by comparing the intensity of the driving current measured in the first monitoring step with the intensity of the predetermined driving current.

In the exemplary embodiments, the parking step may include a step of applying a predetermined first driving current to a first clutch control solenoid and a step of applying a predetermined second driving current to the second clutch control solenoid. The monitoring step may measure the intensity of the driving currents applied to the first clutch control solenoid and the second clutch control solenoid.

In the exemplary embodiments, the second monitoring step may determine that parking release has occurred when the intensity of the driving current applied to the first clutch control solenoid is smaller than the first driving current and the intensity of the driving current applied to the second clutch control solenoid is smaller than the second driving current.

In the exemplary embodiments, the second monitoring step may determine that parking release has occurred when the intensity of the driving currents applied to the first and second clutch control solenoids is maintained smaller than the first and second driving currents for a predetermined time or more.

In the exemplary embodiments, when it is determined that parking release has occurred in the second monitoring step, the parking step may be performed again.

In the exemplary embodiments, the parking release monitoring method for an automatic transmission vehicle may further include a warning step of informing a driver that parking release has occurred when it is determined that parking release has occurred in the second monitoring step.

The parking release monitoring device for an automatic transmission vehicle according to exemplary embodiments of the present disclosure can monitor whether parking release occurs even without using an additional sensor. Accordingly, it is possible to reduce the costs for manufacturing parts and improve the price competitiveness of the product. Further, when parking release unexpectedly occurs, it is possible to immediately sense the situation, thus it is possible to prevent a safety accident due to rolling of the vehicle.

BRIEF DESCRIPTION OF THE DRAWINGS

The above and other objectives, features and other advantages of the present invention will be more clearly understood from the following detailed description when taken in conjunction with the accompanying drawings, in which.

DETAILED DESCRIPTION OF THE INVENTION

Description of specific structures and functions are exemplified herein for describing embodiments of the present disclosure, and the embodiments of the present disclosure may be implemented in various ways and should not be construed as limiting the present disclosure.

The present disclosure may be modified in various ways and implemented by various exemplary embodiments, so that specific exemplary embodiments are shown in the drawings and will be described in detail herein. However, it is to be understood that the present disclosure is not limited to the specific exemplary embodiments, but includes all modifications, equivalents, and substitutions included in the spirit and the scope of the present disclosure.

Terms used in the specification, 'first', 'second', etc., may be used to describe various components, but the components are not to be construed as being limited to the terms. The terms may be used only to distinguish one component from another component. For example, the 'first' component may be named the 'second' component, and vice versa, without departing from the scope of the present disclosure.

It is to be understood that when one element is referred to as being 'connected to' or 'coupled to' another element, it may be connected directly to or coupled directly to another element or be connected to or coupled to another element, having the other element intervening therebetween. On the other hand, it is to be understood that when one element is referred to as being 'connected directly to' or 'coupled directly to' another element, it may be connected to or coupled to another element without the other element intervening therebetween. Further, the terms used herein to describe a relationship between elements, that is, 'between', 'directly between', 'adjacent' or 'directly adjacent" should be interpreted in the same manner as those described above.

Terms used in the present specification are used only to describe specific exemplary embodiments rather than limiting the present disclosure. Singular forms are intended to include plural forms unless the context clearly indicates otherwise. It will be further understood that the terms 'comprises' or "have" used in this specification specify the presence of stated features, steps, operations, components, parts, or a combination thereof, but do not preclude the presence or addition of one or more other features, numerals, steps, operations, components, parts, or a combination thereof.

Unless otherwise defined, all terms including technical and scientific terms used herein have the same meaning as commonly understood by those skilled in the art to which the present disclosure belongs. It must be understood that the terms defined by the dictionary are identical with the meanings within the context of the related art, and they should not be ideally or excessively formally defined unless the context clearly dictates otherwise.

Hereinafter, exemplary embodiments of the present disclosure will be described in more detail with reference to the accompanying drawings. Like reference numerals are given to like components in the drawings and repetitive description of the like components is not provided.

Figure 2:
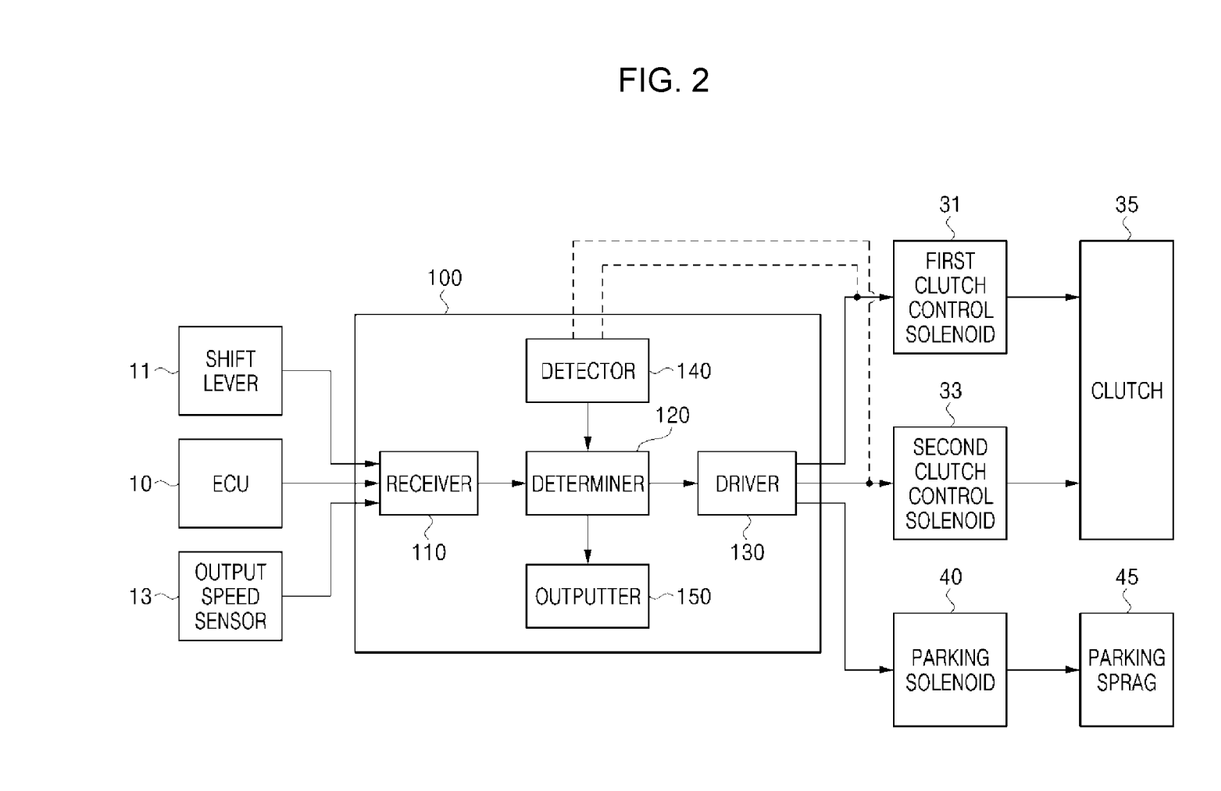
FIG. 2 is a diagram showing a parking release monitoring device for an automatic transmission vehicle according to the present invention.
Figure 3A:
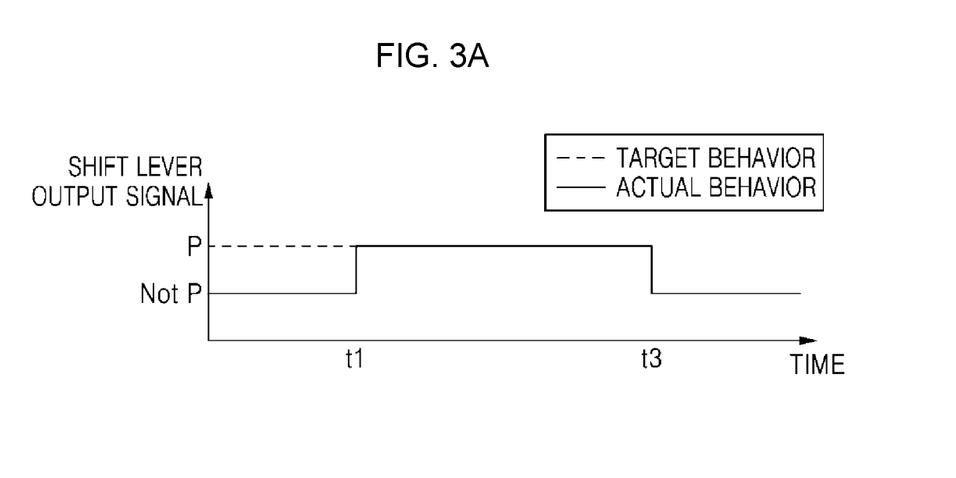
FIG. 3A, FIG. 3B and FIG. 3C are graphs showing changes of control signals and driving currents of solenoids when parking release occurs.
Figure 3B:
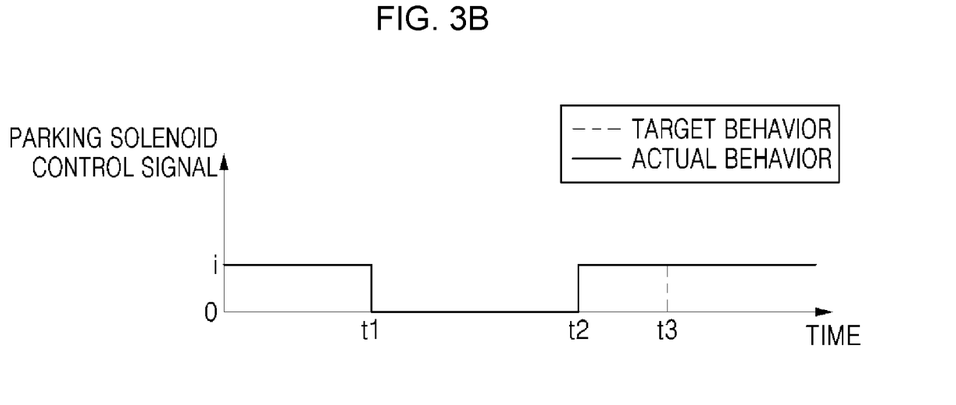
Figure 3C:
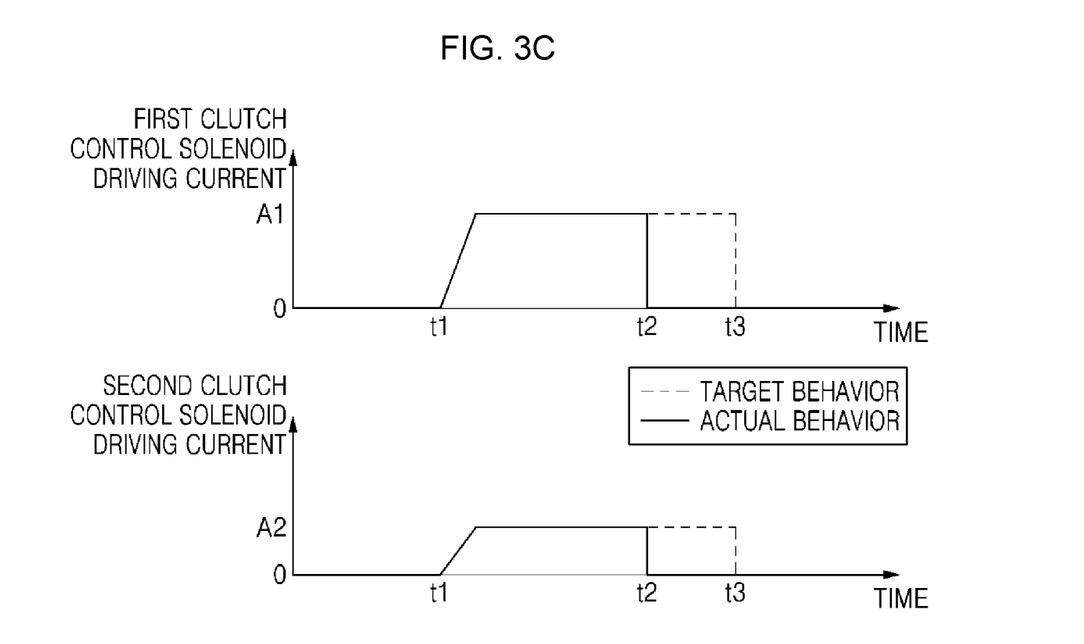

FIG. 2 is a diagram showing a parking release monitoring device for an automatic transmission vehicle according to the present invention. FIGS. 3A to 3C are graphs showing changes of control signals and driving currents of solenoids when parking release occurs.

The automatic transmission vehicle, for example, may be a vehicle equipped with an electric shift-by-wire system.

Referring to FIG. 2, a parking release monitoring device 100 for an automatic transmission vehicle includes: a receiver 110 obtaining shifting information by a driver and state information of the vehicle; a determiner 120 determining a target gear stage and determining whether parking release occurs using the obtained information; a driver 130 selectively driving solenoids 31, 33, and 40; a detector measuring a driving current that is applied to clutch control solenoids 31 and 33; and an outputter 150 outputting a warning signal when parking release unexpectedly occurs.

The receiver 110 can receive a shift lever operation signal by a driver and the current state information of the vehicle. For example, the receiver 110 can receive shift lever operation information by a driver from the shift lever 11, can RPM information of the engine from the ECU 10, and can receive output speed information of the vehicle from the output speed sensor 13. The receiver 110 can receive the information and can provide the received information to the determiner 120 through Controller Area Network (CAN) communication.

The determiner 120 can determine a target gear stage using the information provided from the receiver 110 and can shift into the target gear stage by controlling the driver 130.

In detail, when the determiner 120 transmits target gear stage information to the driver 130, the driver 130 can selectively drive the clutch control solenoids 30. The driver 130 can selectively apply a driving current with specific intensity only to specific clutch control solenoids 30. Accordingly, only the specific clutch control solenoids 30 can be drive by a specific amount and a clutch 35 corresponding to the target gear stage can be engaged.

In an embodiment, when the target gear stage is a P-gear stage (parking), the driver 130 can apply a driving current to the first clutch control solenoid 31 and the second clutch control solenoid 33. It is possible to more surely prevent rolling of the vehicle by engaging the clutch using the two clutch control solenoids 31 and 33. The first and second clutch control solenoids 31 and 33 may be solenoids for engaging the clutch 35 only in the P-gear stage rather than the D-gear stage. That is, a driving current can be applied to the first and second clutch control solenoids 31 and 33 only when the target gear stage is the P-gear stage, and the driving current may not be applied during driving. Accordingly, the determiner 120 can determine whether un-packing has occurred using the intensity of the driving current applied to the first and second clutch control solenoids 31 and 33.

Although the driver 130 controls two clutch control solenoids 31 and 33 to further ensure the parking state in the present disclosure, the present disclosure is not limited thereto. That is, it may be possible to use only one clutch control solenoid when shifting into the P-gear stage, depending on the specifications of vehicle or necessities, or three or more clutch control solenoid may be used. That is, the present disclosure can be applied equally or similarly regardless of the number of clutch control solenoids that are used.

When the target gear stage is the P-gear stage, the driver 130 can additionally drive a parking solenoid 40. When the parking solenoid 40 is turned on, the parking sprag 45 is disengaged and output from the transmission can be transmitted to wheels. When the parking solenoid 40 is turned off, the parking sprag 45 is engaged and output from the transmission cannot be transmitted. That is, when the target gear stage is the P-gear stage, the driver 30 can output an off-control signal to the parking solenoid 40, and accordingly, the parking sprag 45 can be engaged.

The detector 140 can monitor and transmit the intensity of the driving current applied to the clutch control solenoids 30 to the determiner 120. The determiner 120 can monitor whether parking release occurs using the intensity of the driving current feedback by the detector 140. This will be described in more detail with reference to FIGS. 3A to 3C.

As shown in FIG. 3A, when an output signal of the shift lever 11 is changed from Not P to P at the first time point $t_1$, the driver 130 can control the parking solenoid 40 and the clutch control solenoids 31 and 33. In detail, as shown in FIG. 3B, the driver 130 can transmit an off-control signal to the parking solenoid 40. As shown in FIG. 3C, the driver 130 can apply a first driving current A1 to the first clutch control solenoid 31 and can apply a second driving current A2 to the second clutch control solenoid 33.

Accordingly, the parking sprag 45 is engaged and a clutch is engaged, thereby being able to prevent rolling of the vehicle. The first driving current may be 0.5 A and the second driving current may be 0.4 A. However, the values of the first driving current and the second driving current may be appropriately changed, if necessary.

The P-gear stage may be disengaged due to an electrical malfunction of the determiner 120 or the driver 130 or other factors even though the shift lever 11 is not moved from the P-gear stage. In this case, the actual behaviors of the parking solenoid 40 and the clutch control solenoids 31 and 33 may be changed from the target (P-gear stage) behaviors. This is shown at the second time point $t_2$.

In detail, at the time point $t_2$, an on-control signal is output to the parking solenoid 40, so the parking sprag 45 is disengaged. Further, a driving current is stopped being supplied to the first and second clutch control solenoids 31 and 33, so the clutch 35 can be disengaged. Accordingly, regardless of the driver's intention, un-packing may occur and the vehicle may roll.

The detector 140 can measure and provide changes in driving currents of the clutch control solenoids 31 and 33 to the determiner 120. The determiner 120 can determine whether parking release has occurred by comparing the intensity of the measured driving current with the output signal of the shift lever received from the shift lever 11. In detail, when the output signal of the shift lever corresponds to the P-gear stage, the driving currents that are applied to the first and second clutch control solenoids 31 and 33 should be a first driving current A1 and a second driving current A2, respectively. However, when the actually applied riving currents are different from the set values (the first driving current and the second driving current), it is possible to determine that parking release has occurred. In this case, there was a time difference of several seconds between parking release and sensing in the existing monitoring devices that use the parking switch 50, but the parking release monitoring device according to the present disclosure is operated in the way of monitoring the intensity of applied currents, so it can immediately sense parking release.

When it is determined that parking release has occurred, the determiner 120 can output an off-control signal for the parking solenoid 40 through the driver 130, apply the first driving current A1 to the first clutch control solenoid 31, and apply a second driving current A2 to the second clutch control solenoid 33. Accordingly, parking can be maintained.

Further, it is possible to induce the driver to take an appropriate measure by providing parking release information through the outputter 150. The outputter 150 can transmit the parking release information to other controllers including the ECU and can perform cooperative control. For example, the ECU can forcibly operate an electronic parking brake, thereby being able to prevent rolling of the vehicle.

As described above, the parking release monitoring device for an automatic transmission vehicle according to the present disclosure can monitor whether parking release occurs even without using an additional sensor. Accordingly, it is possible to reduce the costs for manufacturing parts and improve the price competitiveness of the product. Further, when parking release unexpectedly occurs, it is possible to immediately sense the situation, whereby it is possible to prevent a safety accident due to rolling of the vehicle.

Hereafter, a method of monitoring whether parking release occurs using the parking release monitoring device 100 of FIG. 2 is described in detail with reference to FIG. 4. However, the same components are given the same reference numerals and repetitive description is omitted.

Figure 4:
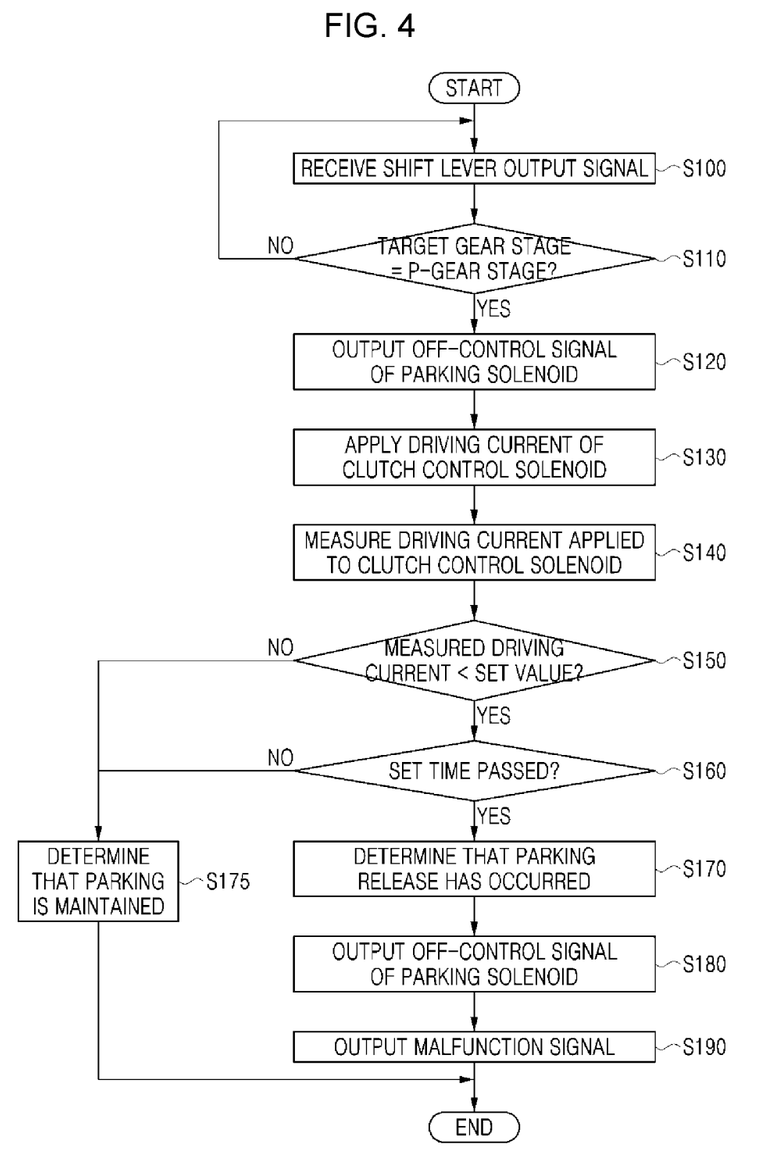
FIG. 4 is a flowchart showing steps of a method of monitoring whether parking release occurs using the parking release monitoring device of FIG. 2.

FIG. 4 is a flowchart showing steps of a method of monitoring whether parking release occurs using the parking release monitoring device of FIG. 2.

Referring to FIG. 4, the method receives an output signal from shift lever 11 (S100) and determines whether a target gear stage is the P-gear stage (S110).

For example, the receiver 110 receives shift lever operation information by a driver, RPM information of an engine, output speed information of a vehicle, etc., and the determiner 120 can determine the target gear stage using the received information.

When the target gear stage is the P-gear stage, an off-control signal for the parking solenoid 40 is output (S120) and driving currents are applied to the clutch control solenoids 31 and 33.

In detail, when the determiner 120 determines that the target gear stage is the P-gear stage, the driver 130 outputs a control signal for turning off the parking solenoid. Accordingly, the parking sprag 45 can be engaged. Further, in order to ensure a parking state, the driver 130 can apply a first driving current A1 to the first clutch control solenoid 31 and can apply a second driving current A2 to the second clutch control solenoid 33. Therefore, the clutch 35 is engaged and rolling of the vehicle can be more surely prevented.

Thereafter, the detector 140 monitors the intensity of the driving currents applied to the first and second clutch control solenoids 31 and 33 (S140). The information of the measured intensity of the driving currents may be provided to the determiner 120.

The determiner 120 compares the measured intensity of the driving currents with the output signal from the shift lever 11. In detail, when the target gear stage is determined as the P-gear stage by operation of the shift lever 11, the intensity of the driving currents to be applied to the first and second clutch control solenoids 31 and 33. Whether the measured intensity of the driving currents is the same as the intensity of the determined intensity of the driving currents is compared. For example, the determiner 120 compares the intensity of the driving current that is applied to the first clutch control solenoid 31 with the first driving current A1 and compares the intensity of the driving current that is applied to the second clutch control solenoid 33 with the second driving current A2.

If the intensity of the driving current that is applied to the first clutch control solenoid 31 is smaller than the first driving current A1 and the intensity of the driving current that is applied to the second clutch control solenoid 33 is also smaller than the second driving current A2, it is possible to determine that parking release has occurred.

However, even though the intensity of the actually applied driving current is smaller than the se values (the first driving current and the second driving current), it is not immediately determined that parking release has occurred, and only when this states is maintained over a predetermined time, it is immediately determined that parking release has occurred (S160). This is because there may be a temporary measurement error. Accordingly, accuracy of diagnosis can be improved.

The determiner 120 can determine that parking release has occurred when the intensity of both of the driving currents applied to the first and second clutch control solenoids 31 and 33 is smaller than the predetermined values and this state is maintained over a predetermined time (S170).

In this case, the determiner 120 can output an off-control signal to the parking solenoid 40 through the driver 130 (S180), and can apply again the first driving current A1 to the first clutch control solenoid 31 and a second driving current A2 to the second clutch control solenoid 33. Accordingly, parking can be maintained.

The outputter 150 can inform the driver that parking release has occurred and can transmit the parking release information to other controllers of the vehicle (S190). Accordingly, the driver can take an appropriate post-measure and additional measure for preventing a safety accident such as operating an electronic parking brake.

When the intensity of both of the driving currents applied to the first and second clutch control solenoids 31 and 33 is the predetermined value or higher or when the time for which the intensity of both of the driving currents is less than the predetermined value is shorter than the predetermined value, it is possible to determine that parking is maintained (S175). In this case, it is possible to keep monitoring whether parking release occurs until the driver intentionally performs parking release.

As described above, the method of monitoring parking release of an automatic transmission vehicle according to the present disclosure can check whether parking release occurs by monitoring the intensity of driving currents applied to the clutch control solenoids. Accordingly, when parking release occurs, it is possible to immediately sense the parking release. Further, since there is no need for using a specific sensor, it is possible to reduce the manufacturing cost of the product.

Although the present disclosure was described above with reference to exemplary embodiments, it should be understood that the present disclosure may be changed and modified in various ways by those skilled in the art, without departing from the spirit and scope of the present disclosure described in claims.

What is claimed is:

1. A parking release monitoring device for an automatic transmission vehicle, the parking release monitoring device comprising:
    a signal receiver sensing an output signal of a shift lever;
    a gear stage determiner determining a target gear stage in accordance with the output signal of the shift lever;
    a solenoid driver transmitting a control signal to a parking solenoid to engage a parking sprag and applying a driving current to a clutch control solenoid to engage a clutch and prevent rolling of the vehicle when the determined target gear stage is a P-gear stage; and a current detector measuring change in the driving current applied to the clutch control solenoid, wherein the gear stage determiner receives measured intensity information of the driving current applied to the clutch control solenoid from the current detector and compares the received intensity information of the driving current with the output signal of the shift lever, thereby determining whether parking release has occurred, and when the target gear stage is the P-gear stage, the solenoid driver is configured to apply the driving current to the clutch control solenoid, and wherein the gear stage determiner is configured to conclude that the parking release has occurred when the drive current of the clutch control solenoid measured by the current detector unit is smaller than the drive current applied to the clutch control solenoid by the solenoid driver.

2. The parking release monitoring device of claim 1, wherein the clutch control solenoid includes first and second clutch control solenoids, and when the target gear stage is the P-gear stage, the solenoid driver applies a first driving current to the first clutch control solenoid and a second driving current to the second clutch control solenoid.

3. The parking release monitoring device of claim 2, wherein the gear stage determiner determines that the parking release has occurred when the driving current of the first clutch control solenoid measured by the current detector is smaller than the first driving current and the driving current of the second clutch control solenoid is smaller than the second driving current.

4. The parking release monitoring device of claim 2, wherein the gear stage determiner determines that the parking release has occurred when the driving currents of the first and second clutch control solenoids measured by the current detector is maintained smaller than the first and second driving currents for a predetermined time or more than the predetermined time.

5. The parking release monitoring device of claim 1, wherein when the gear stage determiner determines that the parking release has occurred, the solenoid driver transmits again a parking sprag engagement signal to the parking solenoid and applies again a driving current to the clutch control solenoid.

6. The parking release monitoring device of claim 1, further comprising a warning outputter outputting a warning signal when the gear stage determiner determines that the parking release has occurred.

* * * * *